(12) United States Patent
Pecen et al.

(10) Patent No.: US 7,885,215 B2
(45) Date of Patent: Feb. 8, 2011

(54) METHOD AND APPARATUS FOR ALLOCATING COMMUNICATION RESOURCES TO COMMUNICATE DATA IN A RADIO COMMUNICATION SYSTEM

(75) Inventors: Mark Pecen, Waterloo (CA); Mihal Lazaridis, Waterloo (CA); Sean Simmons, Waterloo (CA)

(73) Assignee: Research in Motion Limited, Waterloo (CA)

( * ) Notice: Subject to any disclaimer, the term of this patent is extended or adjusted under 35 U.S.C. 154(b) by 503 days.

(21) Appl. No.: 11/272,434

(22) Filed: Nov. 10, 2005

(65) Prior Publication Data

US 2007/0104175 A1 May 10, 2007

(51) Int. Cl.
*H04J 3/00* (2006.01)

(52) U.S. Cl. .................. 370/310; 370/321; 370/329; 370/337; 370/338; 370/347

(58) Field of Classification Search .......... 370/310, 370/321, 329, 331, 337, 338, 347, 348, 339, 370/462, 459; 455/450, 455, 452, 512
See application file for complete search history.

(56) References Cited

U.S. PATENT DOCUMENTS

| | | | | |
|---|---|---|---|---|
| 5,299,190 | A * | 3/1994 | LaMaire et al. | 370/413 |
| 6,088,578 | A * | 7/2000 | Manning et al. | 455/68 |
| 6,359,898 | B1 * | 3/2002 | Cudak et al. | 370/442 |
| 6,597,672 | B1 | 7/2003 | Gustafsson | |
| 6,606,500 | B1 * | 8/2003 | Kronestedt | 455/453 |
| 6,751,193 | B1 * | 6/2004 | Kudrimoti et al. | 370/231 |
| 6,847,826 | B1 * | 1/2005 | Wesby et al. | 455/502 |
| 6,895,248 | B1 * | 5/2005 | Akyol et al. | 455/452.1 |
| 7,194,017 | B2 * | 3/2007 | Hervey et al. | 375/132 |
| 2003/0060209 | A1 * | 3/2003 | Bruin et al. | 455/452 |
| 2004/0072571 | A1 | 4/2004 | Halonen | |
| 2004/0151156 | A1 * | 8/2004 | Noel et al. | 370/349 |
| 2006/0078039 | A1 * | 4/2006 | Dhar et al. | 375/132 |
| 2006/0104334 | A1 * | 5/2006 | Hervey et al. | 375/133 |
| 2007/0104101 | A1 * | 5/2007 | Sadr | 370/230 |

FOREIGN PATENT DOCUMENTS

EP 0938208 8/1999

* cited by examiner

*Primary Examiner*—Patrick N Edouard
*Assistant Examiner*—Julio Perez

(57) ABSTRACT

Apparatus and method for allocating communication resources in a data radio communication system, such as an MAIO (Mobile Allocation Index Offset) communication system, e.g., a communication system that provides for Enhanced Data for GSM Evolution (EDGE) data services. A multi-carrier radio resource control logic element includes an analyzer that analyzes communication resource requirements to carry out a communication service. A resource allocator allocates communication resources to be used by which to communicate the data. The communication resources are allocated across a plurality of radio carriers such that resources are allocated, during a particular time period, upon a single radio carrier of the plurality of radio carriers.

21 Claims, 3 Drawing Sheets

METHOD AND APPARATUS FOR ALLOCATING COMMUNICATION RESOURCES TO COMMUNICATE DATA IN A RADIO COMMUNICATION SYSTEM

The present invention relates generally to the communication of data pursuant to a high-speed data communication service, such as an Enhanced Data for GSM Evolution (EDGE) communication service. More particularly, the present invention relates to apparatus, and method by which to allocate communication resources across a plurality of mobile allocation index offsets or radio frequency carriers in a manner such that resources, during a single timeslot, are assigned to a single index offset or radio frequency carrier.

BACKGROUND OF THE INVENTION

Communication technologies have advanced at a rapid rate. Such advancements have permitted, amongst other things, the development and deployment of radio communication systems that permit data to be communicated at high communication throughput rates. Increasingly, data services, previously unavailable or only available by way of wired networks, are performed by way of a radio communication system that provide for high-speed data services. And, with continued advancements in communication technologies, the data throughput rates by which data is communicated shall likely yet further increase. For instance, the infrastructures of GSM (Global System for Mobile communications) networks that provide for GPRS (General Packet Radio Service) have been widely deployed and widely utilized to effectuate data communications. An extension to the general GPRS communication scheme, referred to as EDGE (Enhanced Data for GSM Evolution), is presently undergoing deployment. EDGE-capable communication systems permit data throughput rates that are significantly higher than those achievable in the predecessor GPRS systems.

While EDGE-capable systems represent a significant improvement in terms of achievable data throughput rates, there is a continuing need to increase yet further the achievable data throughput rates to permit increasingly data-intensive communication services to be performed in a timely manner.

Operation of an EDGE-capable communication system is set forth in a promulgation of an operating specification. The operating specification defines, amongst other things, the channel structure that is used in EDGE-based communications. Multiple carriers are available for use, sometimes defined logically in terms of mobile index allocation offsets. However, due various requirements, communication resources that are allocated upon which to communicate data to perform a communication service are allocated upon a single carrier. Communication resources, to date, are not allocated upon multiple carriers or, more generally, across a plurality of mobile allocation index offsets.

If a manner could be provided in a high-speed data radio communication system to utilize more fully communication resources available across a plurality of radio carriers, increased data throughput rates would be achievable.

It is in light of this background information that the significant improvements of the present invention have evolved.

DETAILED DESCRIPTION

Figure 1:
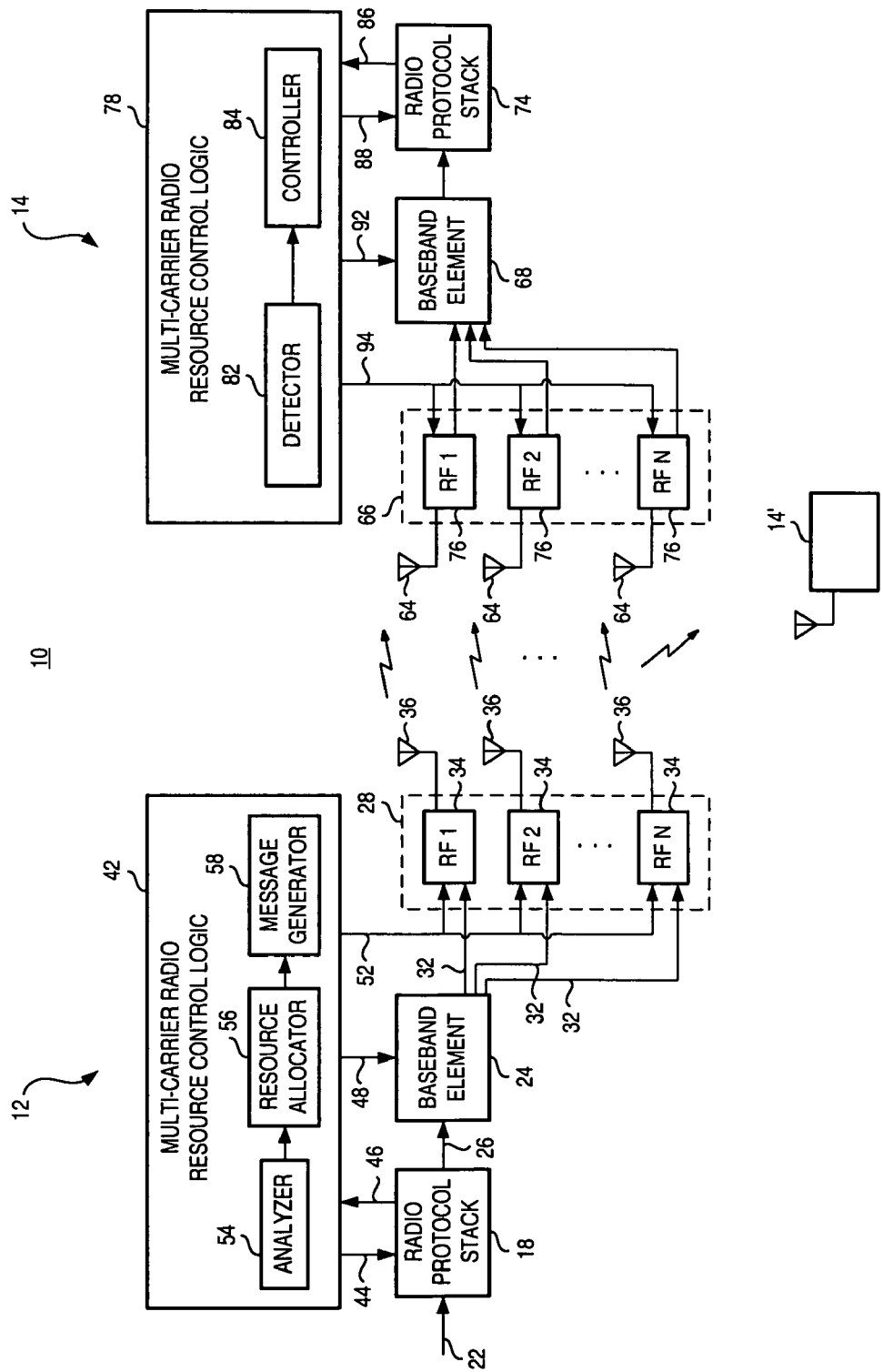
FIG. 1 illustrates a functional block diagram of an exemplary communication system that includes an embodiment of the present invention as a portion thereof.

The present invention, accordingly, advantageously provides apparatus and method for use in the communication of data pursuant to a high-speed data radio communication service, such as EDGE (Enhanced Data for GSM Evolution) data communicated to perform a data communication service in an EDGE-capable communication system.

Through operation of an embodiment of the present invention, the communication resources are allocated across a plurality of mobile allocation index offsets by which to communicate the data. Allocations are made in a manner that resources, during a single timeslot, are assigned on a single carrier, i.e., a single index offset.

By permitting the resource allocation across radio carriers of a plurality of radio carriers, the likelihood of resource availability during any particular timeslot is greater than the likelihood of a corresponding level of resources being available at a single carrier. Existing resource allocation schemes generally limit the allocation of resources pursuant to a communication session to a single carrier.

A contiguous series or sequence, such as a block, of time slots can be allocated for the performance of a data communication service during a communication session. When a contiguous sequence is available within a frame across a plurality of radio carriers, the data throughput, and resultant communication of the data, is more likely to be greater than that available when allocations are limited to those made upon a single carrier. Even if contiguous sequences, across a plurality of carriers are not available within a single frame, the likelihood of greater levels of resources being available across the plurality of radio carriers increases the likelihood of improved data throughput rate performance.

In one aspect of the present invention, apparatus is embodied at a network part of the data radio communication system. The apparatus embodied at the network part comprises an analyzer. The analyzer analyzes communication resource requirements needed to, or otherwise requested to, be provided to communicate data to perform a selected communication service. The analyzer determines, for instance, the number of time slots that are needed to be allocated to the communication session to permit the data to be communicated between a set of communication stations. Determinations made by the analyzer are made dynamically, such as on a frame basis, upon a group of frames basis, or upon another basis, all in a manner to provide resource allocation to communicate data.

In another aspect of the present invention, apparatus embodied at the network part comprises a resource allocator. The resource allocator allocates resources to permit the communication of the data to perform a communication service. The resources are allocated, e.g., responsive to analysis made of the communication requirements required to communicate the data. The communication resources are defined in terms of timeslot allocations upon mobile allocation index offsets. The resources are allocated such that, for any timeslot within a time frame, the resources are allocated upon a single index offset. That is to say, resources that are allocated are not limited to those of a single carrier, but rather are selectable from across a plurality of available carriers, howsoever logically defined, within the constraint of resources being allocated, at any one time, upon a single one of the carriers.

In another aspect of the present invention, apparatus embodied at the network part includes a message generator. The message generator generates an allocation message that includes values for identifying the communication resources that are allocated to communicate data, such as pursuant to a communication session to perform a data communication service. The allocation message, once generated, is communicated from the network of the communication system to a remote station, e.g., a mobile station. When point-to-multipoint communications are to be performed, an allocation message is sent so that each of the mobile stations receives the allocation message. And multiple point-to-point communication sessions are effectuable, with allocation messages being generated and sent for each of the separate communication sessions.

In another aspect of the present invention, apparatus is embodied at a communication station that receives data. The communication station forms, for instance, a mobile station that receives data communicated thereto by a network of the communication system.

Apparatus embodied at the communication station includes a detector that is configured to detect an allocation message delivered to the communication station. The allocation message identifies communication resources that are allocated to the communication station pursuant to the communication of data. The resources that are allocated, and identified in the message, are defined in terms of mobile allocation index offsets. The resources are allocated such that, for any timeslot within a time frame, resources are allocated upon a single one of the radio carriers.

The apparatus embodied at the communication station includes a controller that controls operation of the communication station responsive to the allocation message delivered to the communication station.

Through the allocation of communication resources across a plurality of radio carriers in which a single radio carrier is allocated with resources during a timeslot, improved data throughput rates are achievable.

In these and other aspects, therefore, apparatus and method is provided for a communication station that operates to communicate data in a communication scheme that defines mobile allocation index offsets. An analyzer is adapted to receive an indication of a characteristic of the data that is to be communicated by the first communication station. The analyzer is configured to analyze communication requirements required for communication of the data. A resource allocator is adapted to receive an indication of the analysis made by the analyzer. The resource allocator is configured to allocate resources, defined in terms of mobile allocation index offsets and timeslots thereon. The resources are allocated such that, for any timeslot, within a time frame, resources are allocated upon a single one of the radio carriers.

In these and other aspects, further apparatus and method is provided for a communication station operable for communication of data in a mobile allocation index offset communication scheme. A detector is configured to detect an allocation message delivered to the communication station. The allocation message identifies communication resources allocated to the communication station pursuant to the communication of the data. The resources that are allocated are defined in terms of timeslots defined on a mobile allocation index offset. And allocations are made across a plurality of index offsets. The resources are allocated such that for any timeslot within a time frame, resources are allocated upon a single one of the radio carriers. A controller is adapted to receive an indication of detections made by the detector. The controller is configured to control operation of the first communication station responsive to the detections made by the detector.

With these aspects in mind, therefore, reference is first made to FIG. 1 that illustrates a communication system, shown generally at 10. The communication system is exemplary of a communication system in which an embodiment of the present invention is operable. In the exemplary implementation, the communication system 10 comprises a data radio communication system that is EDGE-capable, that is, provides for EDGE (Enhanced Data for GSM Evolution) data services. The following description shall describe exemplary operation of the communication system in terms of its exemplary implementation as an EDGE-capable system, capable of providing EDGE-based communication services. In other implementations, an embodiment of the present invention is analogously operable to that described below with respect to its implementation in the EDGE-capable communication system.

The communication system 10 includes a set of communication stations, communication station 12 and communication station 14. The communication station 12 is representative of elements of a network part of the communication system. The communication station 12 shall be referred to herein, at times, as a network station 12. And, the communication station 14 is representative of a mobile station. The communication station 14 shall herein, at times, be referred to as a mobile station 14. During their operation, either of the communication stations 12 and 14 is capable of generating EDGE data pursuant to performance of an EDGE data service. Operation shall be described with respect to performance of a downlink communication service, i.e., communication of data from the network station 12 to the mobile station 14. Operation of the communication system pursuant to uplink data communications are analogous.

A communication station 14' is also shown in FIG. 1. The communication station 14' is representative of another mobile station that is capable of communicating with the network station 12. Multiple point-to-point data communications, as well as point-to-multiple point data communications are effectuable during operation of the communication system. Separate EDGE communication services as well as multicast EDGE communication services are performable during operation of the communication system.

The communication system is operable in general conformity with the protocols and procedures set forth in an appropriate EDGE/GPRS/GSM (Enhanced Data for GSM Evolution/General Packet Radio Service/Global System for Mobile communications) operating specification. Amongst the protocols are definitions of an EDGE channel structure. A TDMA (Time Division Multiple Access) scheme is defined in which groups of eight time slots form a frame, and communication resource allocations are made by allocating time slots within frames during which data is communicated. A maximum transmission rate of 59.2 kb/s per time slot is presently provided. When a communication service is to be performed, communication resources, i.e., time slots within frames defined upon the carriers available for communication, are allocated for the communication of the EDGE data. As each frame includes eight time slots, at least theoretically, all eight time slots of the frame can be allocated to a single communication session, i.e., for the communication of the data between a set of communication stations to perform a communication service. A maximum, theoretical transmission rate of 473.6 kb/s (8*59.2 kb/s =473.6 kb/s) is available per frame. However, in actual practice, allocation of such a large number of time slots per frame on a single carrier is unachievable. Other operating requirements of the EDGE/GPRS/GSM system necessitate that a mobile station make various measurements. Measurements must be made, e.g., upon signals broadcast in cells adjacent to the cell in which the mobile station is positioned. The operating specifications, TS 45.008 [5] and TS 45.002 [2], Annex B specify and define certain of these measurements. Additionally, time slots are sometimes also allocated to perform other data and traffic services.

Competition for the communication resources limits the availability of time slots, particularly contiguous time slots that are available to be allocated to effectuate a communication service. For example, if there is a sixty percent probability of availability of a single time slot for assignment, the statistical probability of six contiguous time slots on a single carrier, i.e., a single mobile allocation index offset, within a frame being available is only 4.67 percent. And, the probability of all eight contiguous time slots of a frame on a single carrier being available drops to 1.68 percent. Even disregarding the limitations due to the need of a mobile station to make measurements, there is a statistically small likelihood that multiple, contiguous time slots would be available on a single carrier for allocation to communicate data pursuant to a particular communication service. Contiguous time slots, or other additional time slots, are sometimes available on other radio carriers. However, to date, particularly in an EDGE-capable system, allocating time slots on different radio carriers is not permitted.

In the illustration of FIG. 1, the communication stations 12 and 14 are functionally represented, formed of functional elements that are implementable in any desired manner. And, the functions performed by the various elements need not necessarily be positioned together at a common physical location but can be distributed across separate physical devices. For example, the elements shown to form portions of the network station 12 need not be positioned at a single physical location, e.g., at a base transceiver station, but rather can be distributed across several physical locations, including, for instance, a base station controller of the network part of the communication system.

The network station here shows its transmit chain portion and includes a radio protocol stack 18 to which user application data is applied by way of the line 22. The user application data is for communication to one or more mobile stations pursuant to one or more EDGE communication sessions. The radio protocol stack includes various logical layers including a radio resource management (RRM) layer. The network station further includes a baseband element 24 to which data is provided, here represented by way of the lines 26. The baseband element performs various baseband operations, such as baseband processing, modulation, and channel coding.

The network station also includes a radio element 28 to which the data is applied from the baseband element, here by way of the lines 32. The radio element is formed, at least functionally, of radio frequency transceiver front ends 34. N radio transceivers are shown in FIG. 1, each of which is coupled to an antenna transducer 36. The transducers transduce the data into electromagnetic form for communication to the communication station 14, or a plurality of communication stations 14.

Pursuant to an embodiment of the present invention, the network station 12 also includes a multi-carrier radio resource control logic element 42. The element 42 is at least functionally coupled to the radio protocol stack 18, here by way of the lines 44 and 46. The element is coupled to the baseband element 24, here by way of the lines 48. And, the control logic element is coupled to the radio element 28, here by way of the lines 52. The logic element, in the exemplary implementation, is embodied at a radio resource management logical layer.

The multi-carrier radio resource control logic element includes an analyzer 54, a resource allocator 56, and an allocation message generator 58. The analyzer 54 receives indications of the data that is to be communicated by the network part to a mobile station pursuant to effectuation of a communication service during a communication session. The indication of the characteristic comprises, for instance, the amount of data that is to be communicated, or some type of indicia that, through analysis by the analyzer, permits the communication requirements to communicate the data to be analyzed. Indications of the analysis performed by the analyzer are provided to the resource allocator.

The resource allocator allocates communication resources based upon the analysis made by the analyzer together with indications of data scheduling information. The communication resource allocations are made across a plurality of radio carriers. In the exemplary implementation, a mobile allocation index offset and time slot combination is provided for each of the allocations made by the allocator. Allocations are made such that, for a single timeslot, resources are assigned on a single carrier. But, resources are assignable upon successive, or sequential, timeslots on different ones of the plurality of radio carriers. The number of radio carriers across which the allocations can be made is also dependent upon the capabilities of the communication stations. For an allocation to be permitted, the communication stations must further be capable of communicating at the frequency of the radio carrier. And, the allocations made by the resource allocator are also dependent upon resource availability, indications of which are further applied to the radio resource control logic.

The resource allocator generates, or causes to be generated, control messages that are provided to the radio protocol stack, the baseband element, and the RF element to control their operation responsive to the allocation of resources made by the allocator. And, an indication of the allocated resources is also provided to the allocation message generator 58. The allocation message generator generates an allocation message that is provided to one or more of the RF transceiver front ends 34 of the RF element 28. The RF transceivers communicate the allocation message to the mobile station to inform the mobile station of the allocated resources.

The mobile station 14 includes structure analogous to the structure of the network station. The mobile station includes structure analogous to the structure forming the network station wherein, here, the receive chain portion of the mobile station is shown. The mobile station is here shown to include an antenna transducer 64, an RF element 66, a baseband element 68, and a radio protocol stack 74. The RF element includes a plurality of RF transceiver front ends 76 similar to the transceivers 34, with different ones of the transceivers being operable at different carrier frequencies.

The mobile station also includes a multi-carrier radio resource control logic element 78 of an embodiment of the present invention. The element 78 includes a detector 82 and a controller 84. The radio resource control logic element is coupled, at least functionally, to the radio protocol stack by way of the lines 86 and 88, to the baseband element 92, and to the RF transceiver front ends of the RF element by way of the lines 94.

The detector 82 operates to detect the allocation message sent by the network station to the mobile station and received at the RF element. The detector extracts values contained in the allocation message, or otherwise operates to identify the communication resources to be allocated for the communication of the data. Detections made by the detector are provided to the controller 84. And, the controller operates to control operation of the mobile station so that the mobile station receives, and operates upon, the communicated data. The controller, for instance, controls operation of the various elements of the mobile station to ensure that the elements are operable at the proper times to receive the data communicated upon the different carriers.

Figure 2:
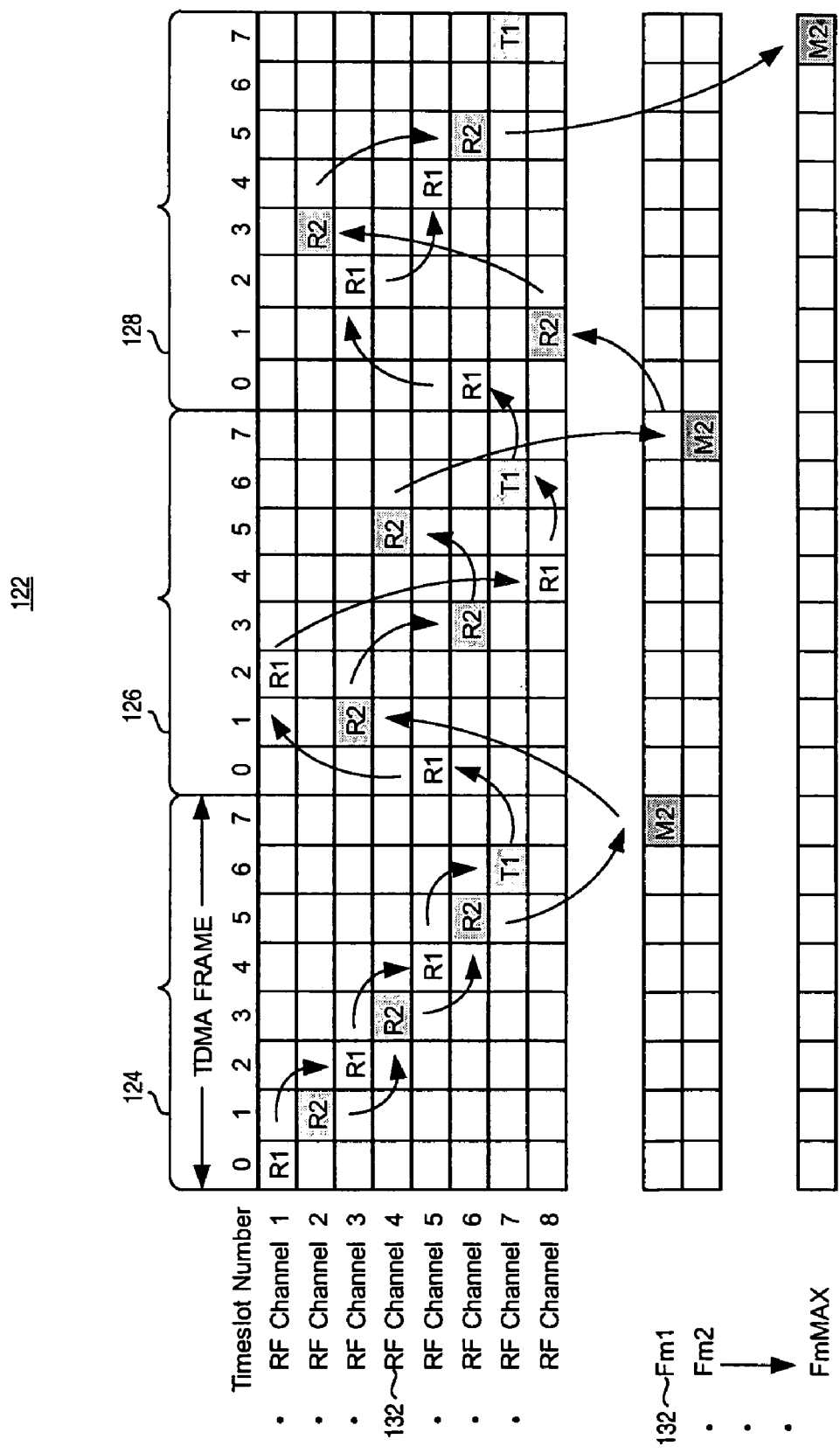
FIG. 2 illustrates a representation of exemplary communication resource allocation made pursuant to operation of an embodiment of the present invention.
Figure 3:
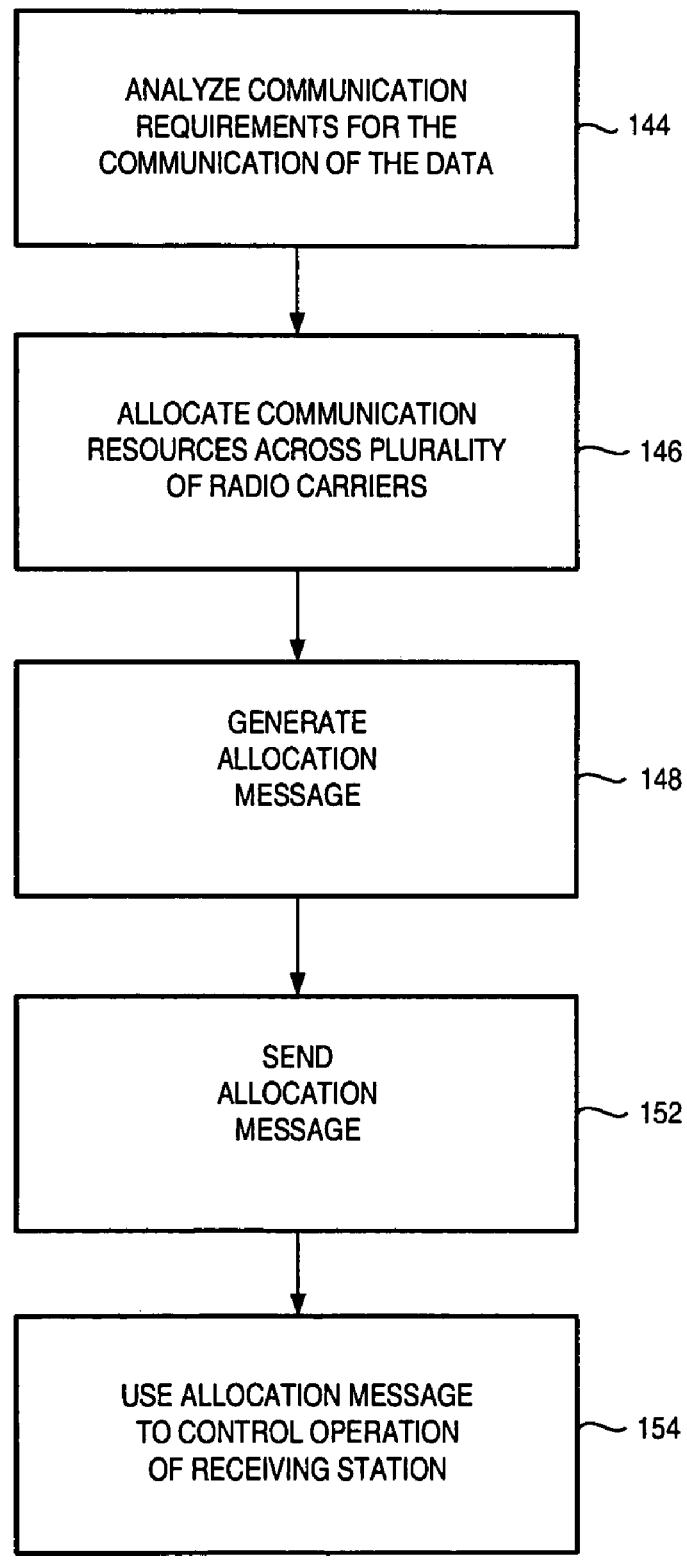
FIG. 3 illustrates a method flow diagram listing the method of operation of an embodiment of the present invention.

FIG. 2 illustrates a representation, shown generally at 122, of communication resource allocations made for the communication of data pursuant to operation of an embodiment of the present invention. The representation illustrates three successive TDMA frames, frames 124, 126, and 128, each of which includes eight time slots, numbered 0-7 in FIG. 3. Eight radio frequency carriers 132, identified as RF channels 1-8 of the inactive cell and carriers Fm 1-FmMAX of an adjacent cell all identify carriers identified in the exemplary communication system. During different timeslots, communication resources are allocated on differing carriers, and resources are not allocated concurrently on more than one carrier. The references R1 and R2 are shown in FIG. 3 to identify the two carriers upon which data is communicated in the example resource allocation in which two carriers are available upon which to communicate data upon any two adjacent time slots. The indications T and M identify periods during which data is transmitted by the mobile station and during which measurements are made by the mobile station, respectively.

Resource allocations are made, by the resource allocator 56 shown in FIG. 1, to maximize the sum of downlink time slots allocated to a single mobile station given the constraint that resource allocations are not made on separate radio carriers during concurrent time slots while also observing the reaction times Tta, Ttb, Tra, and Trb, as defined in the TS-45.002[2], Annex B specification. The reaction times, generally, identify the time required of a mobile station to get ready to transmit or to receive, respectively, before receiving a subsequent burst, transmitting a subsequent burst, or performing a measurement on an adjacent-cell signal.

In the exemplary implementation, the carrier/time slot combinations are selected in terms of an MAIO (Mobile Allocation Index Offset) scheme by "scavenging" for available resources according to the following equation:

$$\text{MAX: } \sum_{t=1}^{Nt} \sum_{R=1}^{Nr} S_{tR} u_{tR}; u \in \{0, 1\}$$

$$\text{St: } u = \begin{cases} a = 1 \wedge f_r \neq f_{r+1} \wedge u_{t-1R} = 0: 1 \\ \text{Else: } 0 \end{cases}$$

Where:
t=timeslot number
R=RF deck number (both transmit and receive)
Nt=Maximum number of timeslots in allocation
Nr=Maximum number of RF decks available for simultaneous reception in mobile terminal
$S_{tR}$=Radio resource of timeslot "t" on RF deck "R" for mobile receiver
$U_{tR}$=Utilization of timeslot "t" on RF deck "R" permitted according to the reaction time constraints (Boolean)
a=Timeslot availability for allocation to mobile downlink (Boolean)

The resources that are allocated pursuant to operation of an embodiment of the present invention are not limited to those available upon a single index offset, but rather are permitted to be allocated across a plurality of index offsets. As a result, a substantially increased possibility of communication resources is likely to be available for allocation and use to communicate data. As EDGE-based, as well as other types of, communication services are increasingly data-intensive, the increased availability of communication resources permits data to be communicated more quickly than that conventionally available.

FIG. 3 illustrates a method flow diagram, shown generally at 142, representative of a method of operation of an embodiment of the present invention by which to communicate data between a set of communication stations in a communication scheme that provides for mobile allocation index offset. First, and as indicated by the block 144, communication requirements required for the communication of the data are analyzed. The analysis is performed responsive to an indication of a characteristic of the data.

Then, and as indicated by the block 146, communication resources are allocated across a plurality of radio carriers for the communication of the data. The resources are allocated such that for any particular time period, resources are allocated upon a single one of the radio carriers.

Thereafter, and as indicated by the blocks 148 and 152, an allocation message is generated and sent by a sending communication station to a receiving communication station that identifies allocations of the communication resources. And, as indicated by the block 154, the allocation message is used at the receiving communication station to control its operation pursuant to communication of data across the plurality of radio carriers.

The performance, measured in terms of data throughput rates of a high-speed data service is improved by increasing the likelihood that greater amounts of communication resources can be made available to effectuate a data communication service. Increasingly data-intensive data communication services are better able to be carried out without noticeable delay.

The previous descriptions are of preferred examples for implementing the invention, and the scope of the invention should not necessarily be limited by this description. The scope of the present invention is defined by the following claims.

What is claimed is:

1. Apparatus for a first communication station operable to communicate data in a communication scheme that provides for mobile allocation index offset, said apparatus comprising:

an analyzer adapted to receive an indication of a characteristic of the data that is to be communicated by the first communication station, said analyzer configured to analyze communication requirements required for communication of the data so that the data can be transmitted in a series of time division multiple access (TDMA) frames and to determine needed resources in a manner that permits dynamic resource allocation;

a resource allocator adapted to receive an indication of the analysis made by said analyzer, said resource allocator configured to allocate resources defined in terms of mobile allocation index offsets as a function of both resource availability and communication-station compatibility such that, for any time period within a TDMA frame, resources are allocated upon a single one of the mobile allocation index offsets; and an allocation message generator adapted to receive an indication of the allocation made by said resource allocator, said allocation message generator configured to generate an allocation message identifying the allocation made by said resource allocator.

2. The apparatus of claim 1 wherein said resource allocator is further adapted to receive an indication of selection of single mobile allocation index offset per time period operation by which to communicate the data, the resources allocated by said resource allocator further responsive to the indication of the selection of the single mobile allocation index offset per time period operation.

3. The apparatus of claim 2 wherein the indication of the selection of the single mobile allocation index offset per time period operation is formed at the first communication station.

4. The apparatus of claim 2 wherein the indication of the selection of the single mobile allocation index offset per time period is formed external to the first communication station and delivered thereto.

5. The apparatus of claim 4 wherein the first communication station is operable to communicate with a second communication station, and wherein the indication of the selection of the single mobile allocation index offset per time period operation is provided to the first communication station by the second communication station.

6. The apparatus of claim 1 wherein the first communication station comprises a radio part having radio elements operable at a plurality of radio carriers across which said resource allocator allocates the resources.

7. The apparatus of claim 6 wherein said resource allocator is further configured to generate a radio part control message for application to the radio elements of the radio part to control operation thereof.

8. The apparatus of claim 7 wherein the radio part control message causes individual ones of the radio elements to be operable at least during periods corresponding to time periods during which the individual ones of the radio carriers are allocated for communication.

9. The apparatus of claim 1 wherein the first communication station comprises a baseband part and wherein said resource allocator is further configured to generate a baseband part control message for application to the baseband part to control operation pursuant to allocations made by said resource allocator.

10. The apparatus of claim 9 wherein the baseband part control message causes the baseband part to be operable at least during periods corresponding to time periods during which communication resources are allocated upon any of the plurality of radio carriers.

11. An apparatus for a mobile communication station operable pursuant to communication of data in a communication scheme that provides for mobile allocation index offset, said apparatus comprising:
  a detector configured to detect an allocation message delivered to the mobile communication station, the allocation message identifying communication resources allocated to the mobile communication station pursuant to the communication of the data, the communication resources allocated to the mobile communication station as a consequence of analysis of communication requirements required for communication of the data so that the data can be transmitted in a series of time division multiple access (TDMA) frames and determination of needed resources in a manner that permits dynamic resource allocation and the resources defined in terms of mobile allocation index offsets as a function of both resource availability and mobile communication-station capability such that, for any time period within the time division multiple access (TDMA) frame, resources are allocated upon a single one of the mobile allocation index offsets; and
  a controller adapted to receive an indication of detections made by said detector, said controller configured to control operation of the mobile communication station responsive to the detections made by said detector.

12. The apparatus of claim 11 wherein the mobile communication station capability comprises a radio part having radio elements operable at the plurality of radio carriers across which communication resources are identified in the allocation message detected by said detector.

13. The apparatus of claim 12 wherein said controller is further configured to generate a radio part control message for application to the radio part to control operation thereof responsive to allocations identified in the allocation message.

14. A method for communicating in a communication scheme that provides for mobile allocation index offset, said method comprising the operations of:
  analyzing, at a network part, communication requirements required for communication of data responsive to an indication of a characteristic of the data to transmit data in a series of time division multiple access (TDMA) frames and to determine needed resources in a manner that permits dynamic resource allocation;
  allocating, at the network part and responsive to analysis made during said operation of analyzing, resources across a plurality of mobile allocation index offsets as a function of both resource availability and communication-station capability such that, for any particular time period within a time division multiple access (TDMA) frame, resources are allocated upon a single one of the mobile allocation index offsets, the allocation of resources being made on a periodic basis; and
  generating an allocation message identifying the allocation made during said operation of allocating.

15. The method of claim 14 further comprising the operations of:
  sending said generated allocation message from a first communication station to a second communication station; and
  using the allocation message at the second communication station to control operation thereof pursuant to communication of the data across the plurality of radio carriers allocated during said operation of allocating.

16. The method of claim 15 wherein said operation of using comprises applying radio part control messages to radio elements of the second communication station, the radio part control messages causing operation of the radio elements to permit reception of the data communicated by way of the communication resources allocated during said operation of allocating.

17. The method of claim 16 wherein allocations of the resources made during said operation of allocating are further responsive to reaction times required of operation of the radio elements of the radio part.

18. The method of claim 17 wherein the reaction times comprise time periods required of the radio elements to tune to a radio carrier of the plurality of radio carriers.

19. The method of claim 17 wherein resources allocated during said operation of allocating are further responsive to non-communication measurement requirements required of at least one of the first and second communication stations, respectively.

20. Apparatus for a first communication station operable to communicate data in a communication scheme that provides for mobile allocation index offset, said apparatus comprising:

an analyzer adapted to receive an indication of a characteristic of the data that is to be communicated by the first communication station, said analyzer configured to analyze communication requirements required for communication of the data so that the data can be transmitted in a series of time division multiple access (TDMA) frames and to determine needed resources in a manner that permits dynamic resource allocation; and a resource allocator adapted to receive an indication of the analysis made by said analyzer, said resource allocator configured to allocate resources defined in terms of mobile allocation index offsets as a function of both resource availability and communication-station compatibility such that, for any time period within a TDMA frame, resources are allocated upon a single one of the mobile allocation index offsets and said resource allocator further adapted to receive an indication of selection of a single mobile allocation index offset per time period operation by which to communicate the data, said indication of the selection of the single mobile allocation index offset per time period being formed external to the first communication station and delivered thereto, the resources allocated by said resource allocator further responsive to the indication of the selection of the single mobile allocation index offset per time period operation, wherein the first communication station is operable to communicate with a second communication station, and wherein the indication of the selection of the single mobile allocation index offset per time period operation is provided to the first communication station by the second communication station.

21. The apparatus of claim 20 further comprising an allocation message generator adapted to receive an indication of the allocation made by said resource allocator, said allocation message generator configured to generate an allocation message identifying the allocation made by said resource allocator.

* * * * *